United States Patent
Tax et al.

(10) Patent No.: US 12,063,168 B1
(45) Date of Patent: Aug. 13, 2024

(54) SYSTEMS AND METHODS FOR OPTIMIZATION OF COMPUTING RESOURCES

(71) Applicant: The Toronto-Dominion Bank, Toronto (CA)

(72) Inventors: David Samuel Tax, Toronto (CA); Milos Dunjic, Oakville (CA); Vipul Kishore Lalka, Oakville (CA); Jonathan Joseph Prendergast, West Chester, PA (US); Hitesh Bajaj, Duluth, GA (US); Susan Elizabeth Hawkins, Olga, WA (US)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 18/303,164

(22) Filed: Apr. 19, 2023

(51) Int. Cl.
  *H04L 47/70* (2022.01)
  *H04L 47/83* (2022.01)

(52) U.S. Cl.
  CPC .......... *H04L 47/822* (2013.01); *H04L 47/821* (2013.01); *H04L 47/83* (2022.05)

(58) Field of Classification Search
  CPC ............................... H04L 47/70; G06Q 40/06
  See application file for complete search history.

(56) References Cited

U.S. PATENT DOCUMENTS

| | | | |
|---|---|---|---|
| 8,190,504 B1 | 5/2012 | Stolz et al. | |
| 8,533,087 B2 | 9/2013 | Lyons et al. | |
| 9,965,808 B1 | 5/2018 | Kunz et al. | |
| 10,643,288 B2 | 5/2020 | Orsini et al. | |
| 11,436,550 B2 | 9/2022 | Turner et al. | |
| 2003/0154112 A1* | 8/2003 | Neiman | G06F 9/5044 705/5 |
| 2004/0153388 A1 | 8/2004 | Fisher et al. | |
| 2009/0106140 A1 | 4/2009 | De La Motte | |
| 2013/0290974 A1* | 10/2013 | Druyan | G06F 9/4881 718/103 |
| 2015/0149333 A1 | 5/2015 | Yaplee et al. | |
| 2018/0158146 A1 | 6/2018 | Turner | |
| 2018/0204288 A1 | 7/2018 | Muthyalu | |

(Continued)

OTHER PUBLICATIONS

Lyandres, Evgeny; Costly external financing, investment timing, and investment-cash flow sensitivity; Published in Journal of Corporate Finance 13.5; retrieved from https://www.sciencedirect.com/science/article/abs/pii/S0929119907000570 Dec. 2007.

(Continued)

*Primary Examiner* — Caroline H Jahnige
(74) *Attorney, Agent, or Firm* — Rowand LLP (57) ABSTRACT

Methods and computer systems for optimization of computing resources. Obtaining one or more parameters of a resource demand, the one or more parameters including at least a defined date. Identifying, based on a projected demand for a computing resource, a resource optimization opportunity prior to the defined date. Generating a message based on the identification of the resource optimization opportunity. Identifying a second computer system based on the resource demand. Facilitating access to the computing resource prior to the defined date by a transmitting the generated message to the identified second computer system prior to the defined date.

20 Claims, 7 Drawing Sheets

(56) References Cited

U.S. PATENT DOCUMENTS

| | | |
|---|---|---|
| 2020/0043092 A1 | 2/2020 | Brucato |
| 2020/0320493 A1 | 10/2020 | Drucker et al. |
| 2021/0142399 A1 | 5/2021 | Joliveau |
| 2022/0147895 A1 | 5/2022 | Katz et al. |
| 2022/0164886 A1 | 5/2022 | Fernandez Stuyck |
| 2022/0206859 A1* | 6/2022 | Jackson ............... G06F 9/505 |
| 2022/0270168 A1 | 8/2022 | Daya et al. |
| 2023/0185621 A1* | 6/2023 | Sen .................. G06F 9/5044 718/104 |

OTHER PUBLICATIONS

Almeida, Heitor, Murillo Campello, and Michael S. Weisbach; The cash flow sensitivity of cash; Published in The Journal of Finance 59.4; retrieved https://onlinelibrary.wiley.com/doi/abs/10.1111/j.1540-6261.2004.00679.x Nov. 27, 2005.

* cited by examiner

SYSTEMS AND METHODS FOR OPTIMIZATION OF COMPUTING RESOURCES

FIELD

The present disclosure relates to computing resources and, more particularly, to systems and methods for optimization of computing resources.

BACKGROUND

Computer systems use various computing resources. Often, computing resources are often used inefficiently and are maintained at suboptimal levels. It would be advantageous to provide for enhanced optimization of computing resources.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION OF EXAMPLE EMBODIMENTS

In one embodiment, the present application describes a computer system. The computer system may include a communications module; one or more processors coupled to the communications module; and a memory coupled to the one or more processors. The memory may store instructions that, when executed by the computer system, cause the computer system to obtain one or more parameters of a resource demand, the one or more parameters including at least a defined date; identify, based on a projected demand for a computing resource, a resource optimization opportunity prior to the defined date; generate a message based on the identification of the resource optimization opportunity; identify a second computer system based on the resource demand; and facilitate access to the computing resource prior to the defined date by a transmission of the generated message to the identified second computer system prior to the defined date.

In some implementations, the one or more parameters may include one or more thresholds used to identify the resource optimization opportunity.

In some implementations, the instructions that, when executed by the computer system, cause the computer system to identify the resource optimization opportunity may include instructions that, when executed by the computer system, cause the computer system to detect a projected shortfall event.

In some implementations, the generated message may include a modified version of the resource demand.

In some implementations, the modified version of the resource demand may provide an offer to demand a reduced amount if the resource demand is satisfied prior to the defined date.

In some implementations, the reduced amount may be determined based on a cost of borrowing to borrow resources to avoid a projected shortfall event.

In some implementations, the instructions that, when executed by the computer system, cause the computer system to identify the resource optimization opportunity may include instructions that, when executed by the computer system, cause the computer system to detect a favorable conversion rate of the computing resource; and determine that the computing resource is not expected to experience a shortfall event by an advancement of a transfer associated with the resource demand.

In some implementations, the generated message may include a transfer of an amount of the computing resource.

In some implementations, the identification of the resource optimization opportunity may be based on one or more of: a determination that a current conversion rate for satisfying the resource demand is a favorable conversion rate; a determination that a projected account balance is expected to remain above a threshold; and a determination that an expected account balance will fall below a threshold.

In some implementations, the one or more parameters may include one or more variables to be used in the identification of the resource optimization opportunity.

In some implementations, the one or more parameters may include a flag indicating that fulfillment of the resource demand may be advanced in response to the identification of the resource optimization opportunity.

In some implementations, the resource demand may include a request for payment.

In another aspect, present application describes a computer-implemented method. The computer-implemented method may include obtaining one or more parameters of a resource demand, the one or more parameters including at least a defined date; identifying, based on a projected demand for a computing resource, a resource optimization opportunity prior to the defined date; generating a message based on the identification of the resource optimization opportunity; identifying a second computer system based on the resource demand; and facilitating access to the computing resource prior to the defined date by transmitting the generated message to the identified second computer system prior to the defined date.

In some embodiments, identifying the resource optimization opportunity may include detecting a projected shortfall event.

In some embodiments, identifying the resource optimization opportunity may include detecting a favorable conversion rate of the computing resource; and determining that the computing resource is not expected to experience a shortfall event by advancing a transfer associated with the resource demand.

In some embodiments, identifying the resource optimization opportunity may be based on one or more of: determining that a current conversion rate for satisfying the resource demand is a favorable conversion rate; determining that a projected account balance is expected to remain above a threshold; and determining that an expected account balance will fall below a threshold.

In some implementations, the one or more parameters may include a flag indicating that fulfillment of the resource demand may be advanced in response to identifying the resource optimization opportunity.

In yet another aspect, present application describes a non-transitory computer-readable storage medium comprising processor-executable instructions which, when executed, may configure one or more processors to obtain one or more parameters of a resource demand, the one or more parameters including at least a defined date; identify, based on a projected demand for a computing resource, a resource optimization opportunity prior to the defined date; generate a message based on the identification of the resource optimization opportunity; identify a second computer system based on the resource demand; and facilitate access to the computing resource prior to the defined date by a transmission of the generated message to the identified second computer system prior to the defined date.

In yet a further aspect, the present application describes a non-transitory computer-readable storage medium storing processor-readable instructions that, when executed, configure one or more processors to perform any of the methods described herein. Also described in the present application is a computing device comprising: one or more processors, memory, and an application containing processor-executable instructions that, when executed, cause the one or more processors to carry out at least one of the methods described herein. In this respect, the term processor is intended to include all types of processing circuits or chips capable of executing program instructions.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The term "real-time", "near real-time", or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 millisecond, less than 1 sec., or less than 5 secs.

Example embodiments of the present application are not limited to any particular operating system, system architecture, mobile device architecture, server architecture, or computer programming language.

Figure 1:
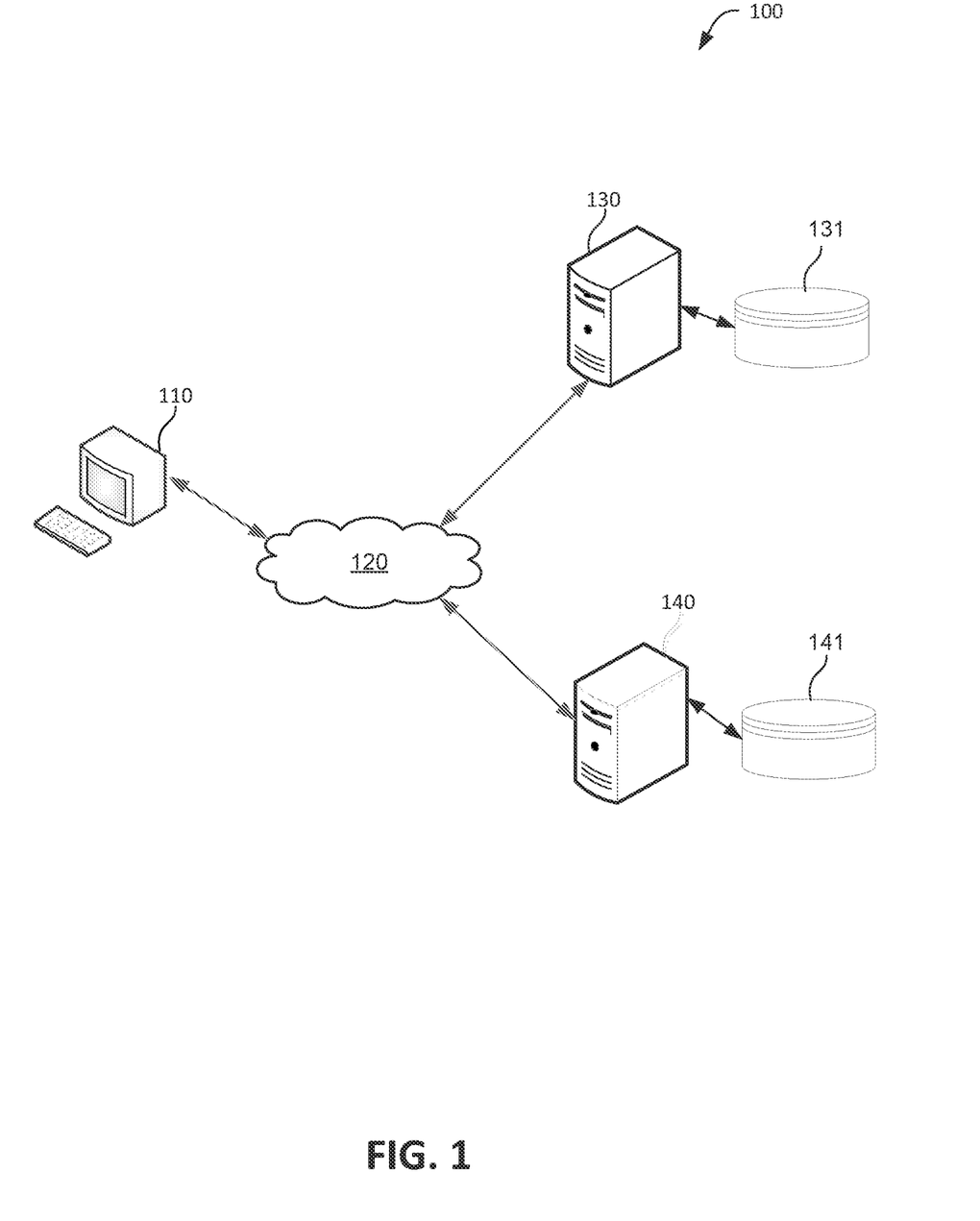
FIG. 1 shows a schematic diagram illustrating an operating environment of an example embodiment according to the subject matter of the present application.

FIG. 1 shows a schematic diagram illustrating an operating environment of an example embodiment. The various components cooperate to provide a computing system 100 which may be used, for example, to optimize a computing resource.

The operating environment in this example includes a client device 110, first system 130, and second system 140. In some embodiments, the operating environment may include one or more client devices or a plurality of client devices, which may include the client device 110.

The client device may be associated with an entity, such as a user or client, having a logical storage area such as a record in a database associated with and/or provided by the first computing system 130. The record may be or represent account data or other data maintained by the first system 130. The logical storage area, such as the record, may include data of various types and the nature of the data will depend on the nature of the first system 130. By way of example, in some implementations, the record may include, for example, documents and/or other data stored by or on behalf of a user. By way of example, in an implementation, a user account may include documents or data uploaded by the user. Such documents and/or data may include, for example, any one or more of: images such as photographs, text-based documents, documents prepared according to a standardized file format, such as portable document format (PDF) documents, user preferences, digital identity data such as stored identity information or documentation, or other types of documents and/or data.

The first system 130 may track, manage, maintain, and/or provide computing resources to the entity associated with the client device 110. A computing resource may be of a variety of types. The computing resources may, for example, be memory or processor cycles. In some embodiments, the computing resource may be a network resource, such as, for example, bandwidth. In some embodiments, the computing resource is a storage resource, such as memory that is used for long-term storage, including for example non-transitory storage such as space in a hard disk drive (HDD), solid state disk drive (SSDD), etc. In some embodiments, a resource may be or include stored value, such as fiat currency, which may be represented in a data store. For example, the first computing system 130 may be coupled to a data store 131, which may be provided in secure storage. The secure storage may be provided internally within the first computing system 130 or externally. The secure storage may, for example, be provided remotely from the first computing system 130. For example, the secure storage may include one or more data centers. The data centers may, for example, store data with bank-grade security. The first system 130 may store data regarding one or more computing resources in data store 131.

The first system 130 may further store data regarding users or customers associated with the first system 130 in in data store 131. The data store 131 may include records associated with a plurality of entities. For example, the records may be for a plurality of accounts and at least some of the records may define or store resources. For example, the records may define a quantity of resources. For example, the entity that is associated with the client device 110 may be associated with an account having one or more records in the database. The records may reflect a quantity of stored resources that are associated with the entity. Such resources may include owned resources and, in at least some embodiments, borrowed resources. The resources that are associated with an entity may be grouped into various buckets. Some such buckets may, for example, represent individual bank accounts. For example, an entity may be associated with one or more bank accounts. At least some of the resources may be borrowed resources. The borrowed resources may, for example, represent an amount of credit that is available to the entity. The entity that is associated with the client device 110 and the account may be a customer of a financial institution which operates or manages the first computing system 130.

The first system 130 may have access to other data such as, for example, resource availability data and/or historical computing resource or event data. Such data may be stored in the database 180 or in another storage system and/or may be accessed from another resource associated with the first computing system 130 such as, for example, one or more processors which may provide real-time resource availability data.

The first computing system 130 may also store data regarding a mapping of an identifier associated with a resource demand (e.g. a transferor, recipient or account identifier) to an identifier of the second system 140 (e.g. an Internet Protocol (IP) address or domain name). The mapping may be stored in data store 131.

The first system 130 may include several additional components. For example, the system 130 may include an optical character recognition (OCR) engine, a natural language processing (NLP) engine, conversion rate engine, and a routing mapper. The optical character recognition engine may be adapted to receive an electronic document and extract text from the document. The text may include be free-form or unstructured text. The natural language processing engine may be adapted to receive the text. The natural language processing engine may identify, based on the text, an intended recipient of an amount of a resource. The recipient may be considered the result of applying a mapping between unstructured text describing the resource demand and a set of possible classifications (recipients) to the free-form text. The natural language processing engine may operate in a variety of manners and may, in some embodiments, employ known natural language processing techniques. For example, support vector machines (SVMs) and/or convolutional neural networks (CNNs) may be employed by the natural language processing engine. In some implementations, the natural language processing engine may correspond to and/or may employ one or more commercially-available software packages and/or services for natural language classification. In a particular example, the natural language processing engine may employ one or more natural-language processing neural networks. Such neural networks and, more broadly, the natural language processing engine may, in some embodiments, be trained, at least initially using a training set (a data set for training) including unstructured texts describing the resource demand and corresponding recipient.

Notably, a skilled person will recognize that employing natural language processing techniques to provide an implementation of the natural language processing engine consistent with the description of the system and, more broadly, consistent with the present application necessarily requires the use of an electronic computer. This need for a computer is particularly clear when one considers the performance requirements necessary to realize benefits of the subject matter of the present application including the desire to facilitate access to a resource in a reasonable time or in real-time in response to an identification of an optimization opportunity.

The system 130 may include a conversion rate engine. The conversion rate engine may generate a conversion rate based on one or more conversion rates obtained from one or more, or a plurality of, external computer systems. The generated conversion rate may also be based on one or more resource demands. In particular, the generated conversion rate may be based on an amount of a resource demand and may be reduced or increased based on the amount of the resource demand.

The system 130 may include a routing mapper. The routing mapper may take the recipient identifier provided by the natural language processing engine 202 and map it to provide the identification of a corresponding server. In some implementations, the routing mapper 204 may correspond to a look-up table mapping possible values of the recipient identifier, or another identifier included in a resource demand, to a server. For example, such a look-up table may map recipient identifiers to server identifiers. In other implementations, the routing mapper may operate in some other manner than using a look-up table. In yet other implementations, the routing mapper may be omitted such as, for example, if the recipient identifier corresponds directly to a server identifier. Put another way, it is possible that, in some implementations, the natural language processing engine serves to classify the text into a set of classifications corresponding to servers.

The first system 130 may be configured to authenticate the client device 110 as being associated with a particular account. More particularly, the first system 130 may authenticate the client device 110 as being associated with account data maintained by the first system 130. Authentication may be performed based on one or more credential such as, for example, a password, username, PIN, fingerprint, etc.

In some embodiments, the first system 130 may provide a front-end interface which allows the client device 110 to interact with the first system 130. For example, the first system 130 may provide one or more graphical user interfaces (GUIs) to the client device 110. By way of example, the first system 130 may provide, to the client device 110, a user interface for uploading data in an authenticated session. The user interface provided to the client device 110 may be an interface for receiving user input indicating a resource demand. A resource demand may indicate a transfer of a resource between the account associated with the first computing system and the account associated with the second computing system and/or a request for a transfer of a resource.

The first system 130 may be managed, operated, and/or controlled by an entity that may be an agent of a first account holder and may be a financial institution, such as a bank. The first account holder may be a customer (e.g. a corporate/business customer) or client of the entity or otherwise associated with the entity. In some embodiments, the first account holder is a requestor or transferee of a data transfer.

As illustrated, the first system 130 is in communication with the second system 140 via the network 120. The first system 130 may be configured to transmit to the second system 140 a message, for example, a transfer message. The second system 140 may be further configured to receive a transfer message from the first system 130.

The second system 140 may be managed, operated, and/or controlled by an entity that may be an agent of a second account holder and may be a financial institution, such as a bank. The second account holder may be a customer (e.g. a corporate/business customer) or client of the entity or otherwise associated with the entity. In some embodiments, the second account holder may, for example, be a recipient of a transfer from the first account holder and the transfer may represent a payment.

The second system 140 may store data regarding one or more computing events in a plurality of respective computing event objects. The second system 140 may further store data regarding users or customers associated with the second system 140 in a plurality of respective user account objects representing respective user accounts. The data may be stored in data store 141.

The first system 130 and second system 140 may be or include transfer processing systems. A transfer processing system may include a transfer processing module implemented as a software module and configured to process transfers such as transfers identified in transfer messages. By way of example, a processing module or system included in the first system 130 may be configured to perform internal transfers by transferring value between two different records in the data store 131 (i.e., between two accounts at the same financial institution) and/or to perform external transfers by interacting with the second system 140 or third party systems. For example, external transfers may be performed using various transfer methods or protocols. In some implementations, at least some transfers may be performed by interacting with other financial institution systems via a SWIFT (Society for Worldwide Interbank Financial Telecommunication) network. A transfer may be successfully processed and completed when value/resources have been successfully transferred from a transferor account to a recipient account. The processing system may track and store data identifying completed transfers.

The client device 110, first system 130 and second system 140 may be configured to ingest data from each other and may transmit requests, replies, alerts, notifications, configuration objects, or other data to each other.

The first system 130 and the second system 140 may store data in respective data stores 131 and 141. The data stores 131 and 141 are illustrated as single units for ease of illustration, but may include a plurality of storage units and, in some cases, storage media connected via the network 120.

As illustrated, the client device 110 is in communication with a first system 130 via a network 120. In some embodiments, the client device 110 may be managed, operated or controlled by the first account holder.

The client device 110 is a computing device and may be configured to receive input. It may, as illustrated, be a desktop computer. However, the client device 110 may be a computing device of another type such as, for example, a smart phone, a laptop computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The client device 110 may be used, for example, to receive user input that includes an indication of a resource demand. The user input may further include an indication of one or more parameters associated with a resource demand. The one or more parameters may include a transfer amount, a category, routing data, intended transferor, recipient, an account associated with the intended transferor, an account associated with the recipient, and other information to be included in or used to populate one or more fields in a resource demand. The one or more parameters may also include a threshold value.

The first system 130 and second system 140 are or include a computer system such as a computer server system, database management system, resource management systems, or data transfer systems. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, web servers, email servers, file transfer protocol (FTP) servers, compute servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The client device 110, first system 130, and second system 140 may be in geographically disparate locations.

The network 120 is a computer network. The network 120 may be an internetwork such as may be formed of one or more interconnected computer networks. For example, such a network may be or may include an Ethernet network, an asynchronous transfer mode (ATM) network, a wireless network, or the like. In some implementations, the network 120 may be the Internet. The network 120 allows the client device 110, first system 130, and second system 140 to communicate with one another.

As further described below, the client device 110, first system 130, and second system 140 may be configured with software to perform associated functions such as those described herein.

FIG. 1 illustrates the first system 130, and second system 140, and data stores 131 and 141 as separate and distinct computing devices. However, these systems may not be separate physical systems. For example, the first system 130 and the data store 131 may be implemented on a common physical device. As another example, the second system 140 and the data store 141 may be implemented on a common physical device. As yet another example, the first system 130 and second system 140 may be implemented in software associated with a common processor. As yet a further example, the data stores 131 and 141 may be included in the first system 130 and second system 140, respectively, or may be external to those systems.

Figure 2:
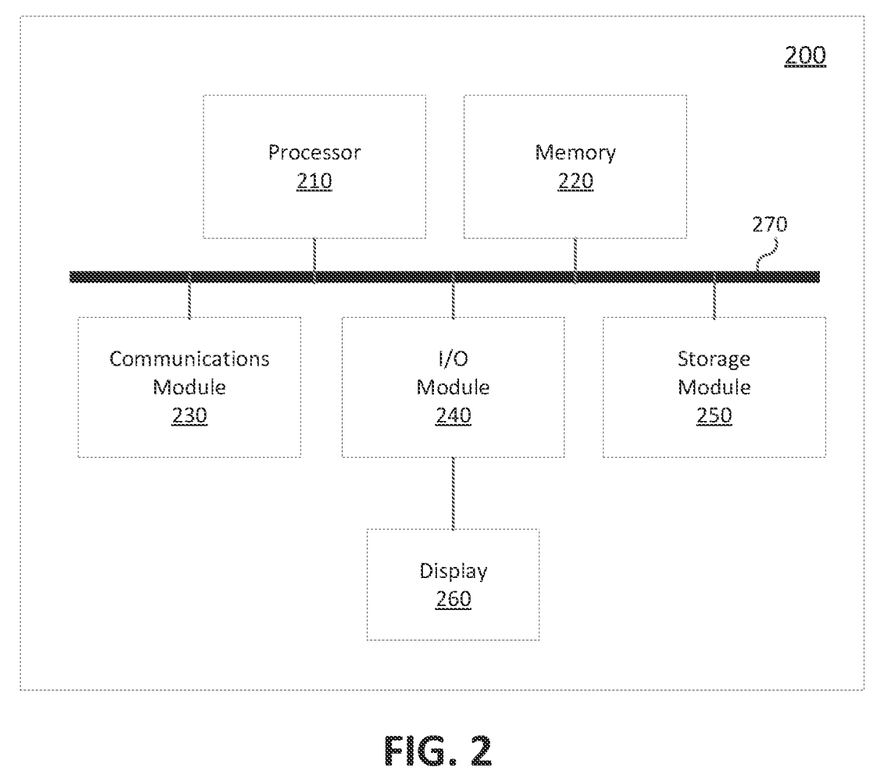
FIG. 2 shows a high-level schematic diagram of the client device of FIG. 1.

An example embodiment of the client device 110 will now be discussed with reference to FIG. 2. FIG. 2 is a high-level schematic diagram of the client device 110. The client device 110 may, in some embodiments, be a personal computer as shown in FIG. 1.

The client device 110 includes a variety of modules. For example, as illustrated, the example computing device 200 may include a processor 210, a memory 220, a communications module 230, an I/O module 240, and/or a storage module 250. As illustrated, the foregoing example modules of the example computing device 200 are in communication over a bus 270. As such, the bus 270 may be considered to couple the various modules of the client device 110 to each other, including, for example, to the processor 210.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the client device 110.

The communications module 230 allows the client device 110 to communicate with other computing devices and/or various communications networks such as, for example, the network 120. For example, the communications module 230 may allow the client device 110 to send or receive communications signals. Communications signals may be sent or received according to one or more protocols or according to one or more standards. The communications module 230 may allow the client device 110 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE), 5G or the like. Additionally or alternatively, the communications module 230 may allow the client device 110 to communicate using near-field communication (NFC), via Wi-Fi™, using Bluetooth™ or via some combination of one or more networks or protocols. In some embodiments, all or a portion of the communications module 230 may be integrated into a component of the client device 110. For example, the communications module 230 may be integrated into a communications chipset.

The I/O module 240 is an input/output module. The I/O module 240 allows the client device 110 to receive input from and/or to provide input to components of the client device 110 such as, for example, various input modules and output modules. For example, the I/O module 240 may, as shown, allow the client device 110 to receive input from and/or provide output to the display 260.

The storage module 250 allows data to be stored and retrieved. In some embodiments, the storage module 250 may be formed as a part of the memory 220 and/or may be used to access all or a portion of the memory 220. Additionally or alternatively, the storage module 250 may be used to store and retrieve data from persisted storage other than the persisted storage (if any) accessible via the memory 220. In some embodiments, the storage module 250 may be used to store and retrieve data in/from a database. A database may be stored in persisted storage. Additionally or alternatively, the storage module 250 may access data stored remotely such as, for example, as may be accessed using a local area network (LAN), wide area network (WAN), personal area network (PAN), and/or a storage area network (SAN). In some embodiments, the storage module 250 may access data stored remotely using the communications module 230. In some embodiments, the storage module 250 may be omitted and its function may be performed by the memory 220 and/or by the processor 210 in concert with the communications module 230 such as, for example, if data is stored remotely.

The client device 110 may include or be connected to a display 260. The display 260 is a module of the client device 110. The display 260 is for presenting graphics. The display 260 may be, for example, a liquid crystal display (LCD). In addition to being an output device, the display 260 may also be an input device. For example, the display 260 may allow touch input to be provided to the client device 110. In other words, the display 260 may be a touch sensitive display module. In a particular example, the display 260 may be a capacitive touch screen.

Software comprising instructions is executed by the processor 210 from a computer-readable medium. For example, software may be loaded into random-access memory from persistent storage of the memory 220. Additionally or alternatively, instructions may be executed by the processor 210 directly from read-only memory of the memory 220.

Figure 3:
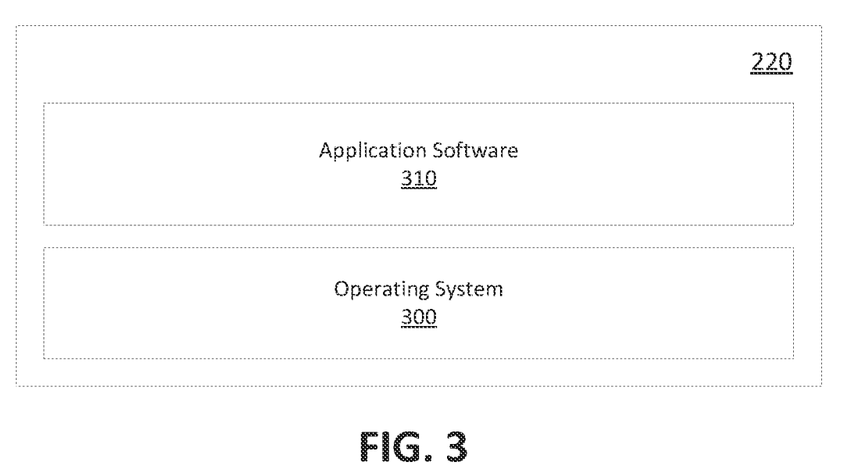
FIG. 3 shows a simplified organization of software components stored in a memory of the client device of FIG. 2.

FIG. 3 depicts a simplified organization of software components stored in the memory 220 of the client device 110. As illustrated, these software components include an operating system 300 and an application software 310.

The operating system 300 is software. The operating system 300 allows the application software 310 to access the processor 210 (FIG. 3), the memory 220, the communications module 230, the I/O module 240, and the storage module 250 of the client device 110. The operating system 300 may be, for example, Google™ Android™, Apple™ iOS™, UNIX™, Linux™, Microsoft™ Windows™, Apple OSX™ or the like.

The application software 310 adapts the client device 110, in combination with the operating system 300, to operate as a device for facilitating data transfers.

As noted above, the first system 130, and second system 140, are or include a computer system. An example computer system 400 will now be discussed with reference to FIGS. 4 and 5. Suitably-configured instances of the example computer system 400 may, in some embodiments, serve as and/or be a part of the first system 130, and/or second system 140.

Figure 4:
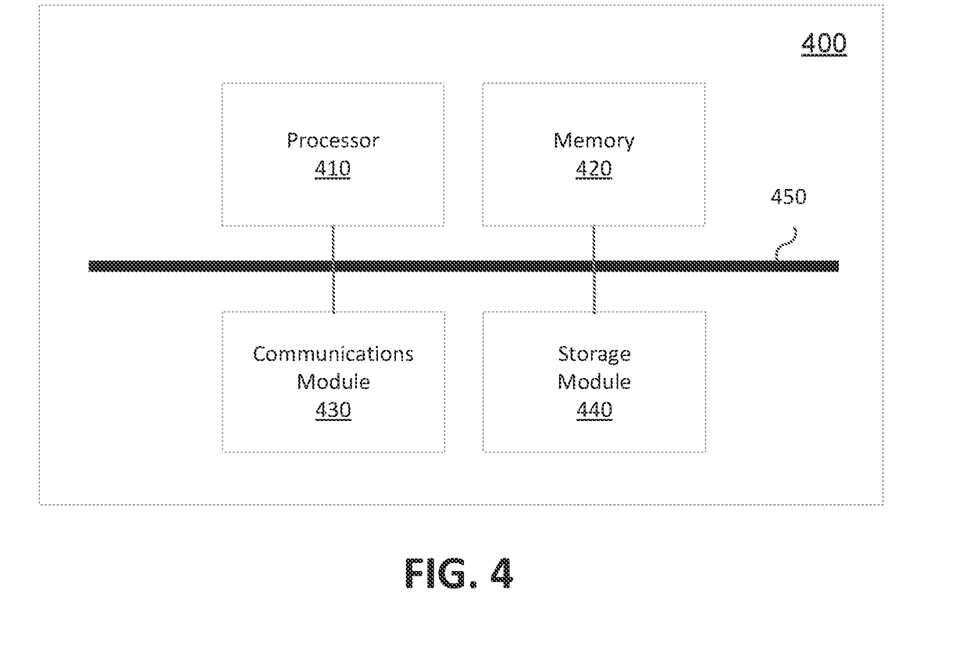
FIG. 4 shows a high-level schematic diagram of an example embodiment of the transferor, recipient, and rescheduling computing systems of FIG. 1.

FIG. 4 is a high-level schematic diagram of an example computer system 400.

The example computer system 400 includes a variety of modules. For example, as illustrated, the example computer system 400 may include a processor 410, a memory 420, a communications module 430, and/or a storage module 440. As illustrated, the foregoing example modules of the example computer system 400 are in communication over a bus 450. As such, the bus 450 may be considered to couple the various modules of the example computer system 400 to each other, including, for example, to the processor 410.

The processor 410 is a hardware processor. The processor 410 may, for example, be one or more ARM, Intel x86, PowerPC processors or the like.

The memory 420 allows data to be stored and retrieved. The memory 420 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computer system 400.

The communications module 430 allows the example computer system 400 to communicate with other computing devices and/or various communications networks such as, for example, the network 120. The communications module 430 may allow the example computer system 400 to send or receive communications signals. Communications signals may be sent or received according to one or more protocols or according to one or more standards. For example, the communications module 430 may allow the example computer system 400 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE), 5G or the like. Additionally or alternatively, the communications module 430 may allow the example computer system 400 to communicate via Wi-Fi™, using Bluetooth™ or via some combination of one or more networks or protocols. In some embodiments, all or a portion of the communications module 430 may be integrated into a component of the example computer system 400. For example, the communications module may be integrated into a communications chipset.

The storage module 440 allows the example computer system 400 to store and retrieve data. In some embodiments, the storage module 440 may be formed as a part of the memory 420 and/or may be used to access all or a portion of the memory 420. Additionally or alternatively, the storage module 440 may be used to store and retrieve data from persisted storage other than the persisted storage (if any) accessible via the memory 420. In some embodiments, the storage module 440 may be used to store and retrieve data in a database. A database may be stored in persisted storage. Additionally or alternatively, the storage module 440 may access data stored remotely such as, for example, as may be accessed using a local area network (LAN), wide area network (WAN), personal area network (PAN), and/or a storage area network (SAN). In some embodiments, the storage module 440 may access data stored remotely using the communications module 430. In some embodiments, the storage module 440 may be omitted and its function may be performed by the memory 420 and/or by the processor 410 in concert with the communications module 430 such as, for example, if data is stored remotely.

Software comprising instructions is executed by the processor 410 from a computer-readable medium. For example, software may be loaded into random-access memory from persisted storage of the memory 420. Additionally or alternatively, instructions may be executed by the processor 410 directly from read-only memory of the memory 420.

Figure 5:
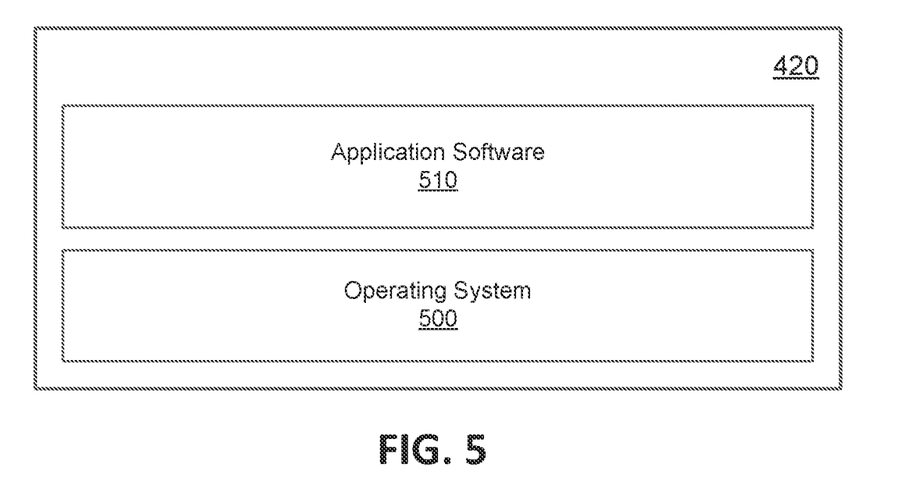
FIG. 5 shows a simplified organization of software components stored in the example computing systems of FIG. 4.

FIG. 5 depicts a simplified organization of software components stored in the memory 420 of the example computer system 400. As illustrated, these software components include an operating system 500 and an application software 510.

The operating system 500 is software. The operating system 500 allows the application software 510 to access the processor 410, the memory 420, the communications module 430, and the storage module 440 of the example computer system 400. The operating system 500 may be, for example, UNIX™, Linux™, Microsoft™ Windows™, Apple OSX™ or the like.

The application software 510, when executed, co-operates with the operating system 500 to adapt the example computer system 400 for some purpose and to provide some defined functionality. For example, the application software 510 may cooperate with the operating system 500 to adapt a suitable embodiment of the example computer system 400 to serve as the first system 130, and/or second system 140.

Figure 6:
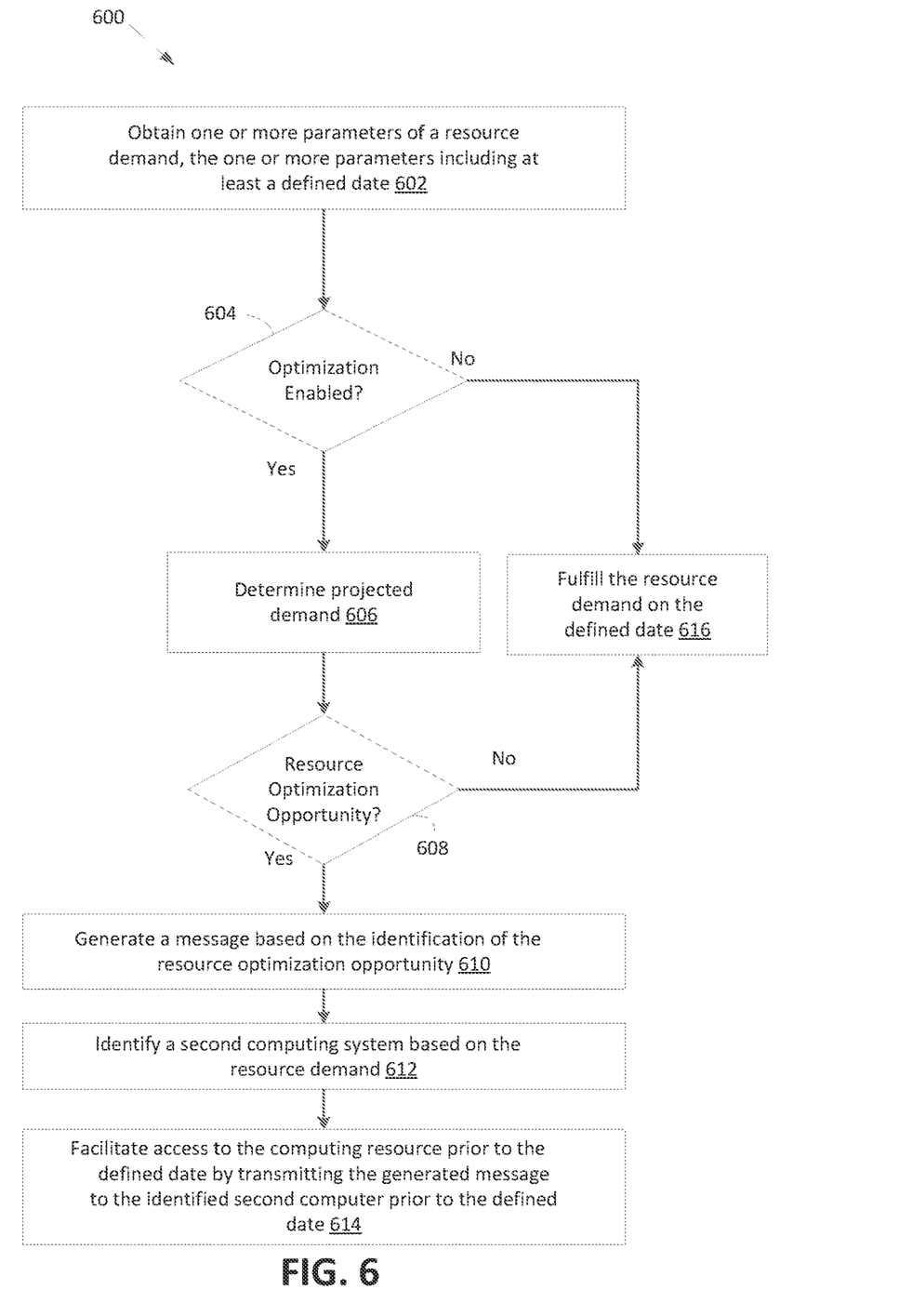
FIG. 6 is a flowchart showing operations performed in providing optimization of a computing resource, according to an example embodiment.

Reference will now be made to FIG. 6 which illustrates an example method 600 for optimizing a computing resource. The operations of the example method 600 may be performed by a computer system which may be of the type described herein. In some embodiments, the operations may be performed by a first computing system 130 of FIG. 1.

The computing system performing the method 600 may cooperate with other computing systems using a communications module. The communications module may be or include a hardware communications module. By way of example, the first computing system 130 may communicate with one or more of a second computing system 140, and a client device 110 in order to perform the method 600 or a variation thereof.

In operation 602, the computing system obtains one or more parameters of a resource demand. The one or more parameters may include one or more variables to be used in the identification of the resource optimization opportunity. In some embodiments, the one or more parameters may include a defined date, one or more thresholds to be used to identify a resource optimization opportunity, and/or a flag enabling optimization.

In operation 604, the computing system determines whether the one or more parameters include a flag (or similar indication) indicating that fulfillment of the resource demand may be advanced in response to the identification of the resource optimization opportunity. The flag may include a value of a binary variable. If the computing system detects the flag, then the computing system may in operation 606 determine a projected demand. Otherwise, the first computing system may in operation 616 fulfil the resource demand on the defined date.

In operation 606, the computing system projects demand for the computing resource. The projected demand may be based on an amount specified by a resource demand and, more particularly, the received resource demand. That is, the received resource demand may be used in determining the projected demand for the resource.

In operation 608, the computing system identifies, based on the projected demand, a resource optimization opportunity prior to the defined date. In some embodiments, identifying the resource optimization opportunity may be based on one or more of a determination that a current conversion rate for satisfying the resource demand is a favorable conversion rate; a determination that a projected account balance is expected to remain above a threshold; and a determination that an expected account balance will fall below a threshold.

Identifying the resource optimization opportunity may also include determining that the computing resource is, or is not, expected to experience a shortfall event by an advancement of a transfer associated with the resource demand.

Identifying the resource optimization opportunity may include detecting a projected shortfall event. This operation may involve a comparison of a projection of the demand for the resource with a projection of the available amount of the resource. The projected available resource may be based on a current amount. A shortfall event may be detected if the projected demand exceeds the projected amount of available resource at a particular time. The particular time may be the defined time extracted from the resource demand. In some embodiments, the amount of available resource at the particular time may be an amount of an account at a due date of a request for transfer. A projected shortfall event may, for example, be detected when a resource associated with an account is projected to be insufficient to satisfy projected requests for transfers.

In response to identifying the resource optimization opportunity, the computing system may, in real-time, take an action to fulfil, or facilitate the fulfilment of, the resource demand prior to the defined date. For example, in operation 610, the computing system generates a message based on the identification of the resource optimization opportunity. The generated message may include one or more parameters. Example parameters include the parameters that are included in the resource demand. In particular, the rescheduling request may include: one or more identifiers that identify the resource demand; one or more identifiers that identify the resource; one or more identifiers that identify a resource or data record associated with the recipient. The identifier(s) may be or include an account number. The request to transfer may also include one or more identifiers that identify the database management system associated with the sender and/or that identify the database management system associated with the recipient. Such identifiers may be or include one or more of a transit number and an institution number.

If the computing system determines that there is no resource optimization opportunity, then the computing system may in operation 616 fulfil the resource demand on the defined date. Otherwise, the first computing system may in operation 612 identify a second computer system.

In operation 612, the computing system identifies a second computer system based on the resource demand. Identifying the second computer system may involve mapping the resource demand to a particular computer system. The first computing system may store a directory of identifiers that map to respective computing systems. The first computing system may obtain an identifier from the resource demand and use that identifier to lookup in the directory a second computer system corresponding to the identifier. In some embodiments, the identifier may be a financial institution identifier at which the transferee is a customer and the second computer system may be represented by an Internet Protocol (IP) address or domain name. The IP address may also be obtained by translating the domain name. The first computing system may use the IP address to connect to the second computer system or transmit a message to the second computer system. In some embodiments, the identifier may be an account identifier and the second computer system may be identified by an email address and/or domain name associated with that account identifier.

In operation 614, the computing system facilitates access to the computing resource prior to the defined date by transmitting the generated message to the identified second computer system prior to the defined date.

Figure 7:
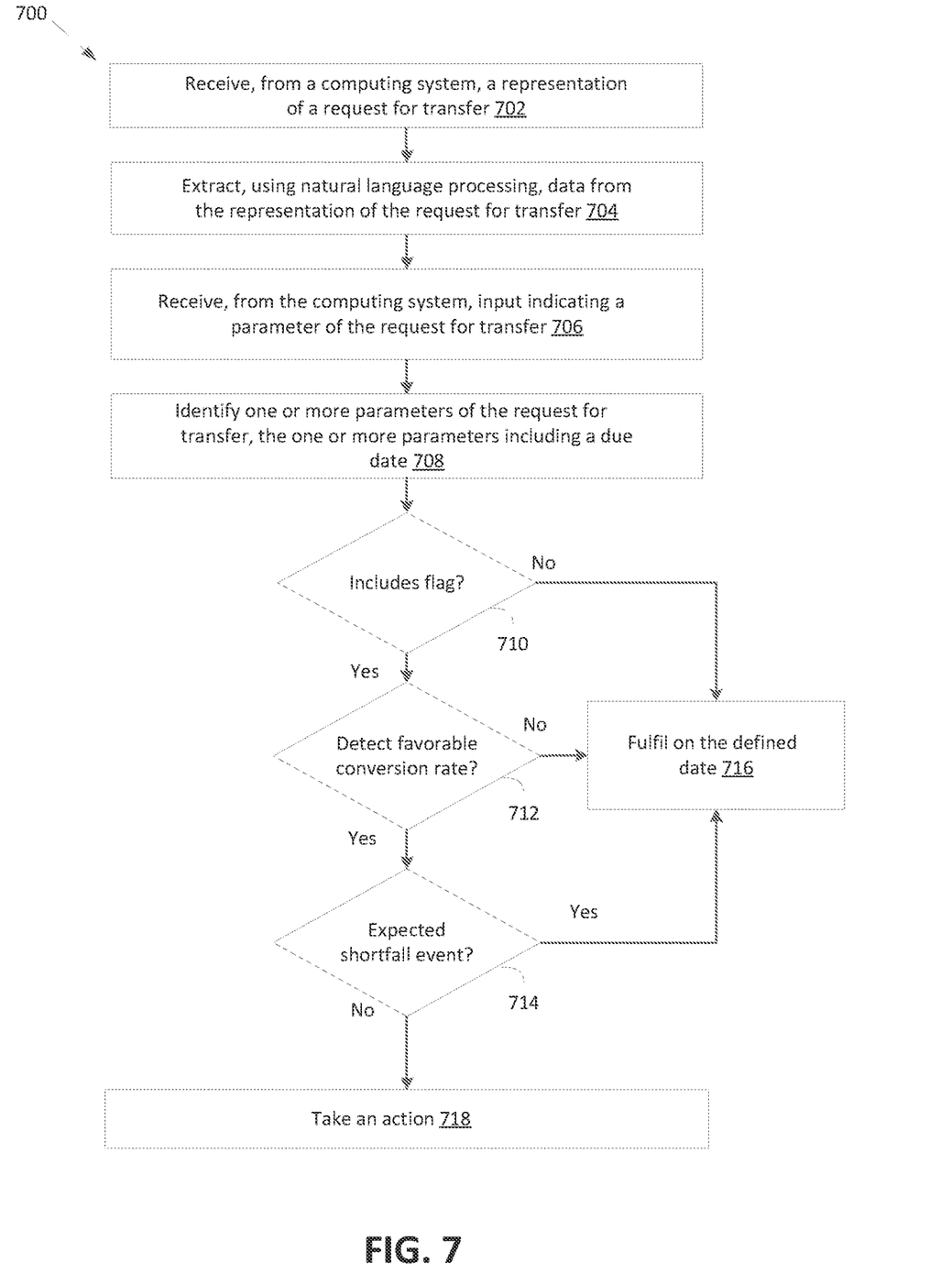
FIG. 7 is another flowchart showing operations performed in providing optimization of a computing resource, according to an example embodiment.

Reference will now be made to FIG. 7 which illustrates an example method 700 for optimizing a computing resource. The operations of the example method 700 may be performed by a computer system which may be of the type described herein. In some embodiments, the operations may be performed by the computing system performing the method 600 of FIG. 6. It will be appreciated that one or more of the operations of the method 700 may correspond to or implement one or more of the operations of the method 600 of FIG. 6.

In some embodiments, a client device, such as a mobile computing device, captures an image of a document representing a resource demand. The image may be captured, for example, using an image capture module of the client device. The image capture module may, for example, include a camera or document scanner. The captured image may then be transmitted to the computing system.

In operation 702, the computing system receives, from the client device, a representation of a resource demand. In some embodiments, the representation is in the form of an image. The representation may include a variety of elements including, for example, a due date and an amount to be electronically transferred. The representation may be formatted, and the elements may be arranged, using an industry-wide standardized template, or formatted and arranged without using an industry-wide standardized template.

The resource demand and corresponding parameters may be received in various ways. For example, the system may include or be associated with a resource demand processing platform that allows third parties to send resource demands to a user of the first computing system via the resource demand processing platform. In such instances, the system may receive the resource demand and/or parameters in a standardized format which allows for easy identification of necessary data such as a demand amount and defined date. In some embodiments the transfer may be an invoice, the demand amount may be a payment amount, and the defined date may be a due date of the payment.

In some embodiments, the resource demand may be received as a transfer message. The transfer message may represent a transfer of value from one account to another. The amount of value may be expressed, for example, in a particular currency, a currency identifier, and/or other information. The computing system may process a transfer message, which may be a computer-readable message configured for transmission over one or more computer networks between a sending device and a receiving device. The transfer message may be a structured message having a defined schema or set of predefined fields to contain data. The transfer message may be used to transfer resources from one entity to another entity. In particular, the transfer message may be used to effect a change in recorded ownership of resources. The resources may be currency, physical assets, credits, tokenized items like non-fungible tokens, computing resources such as memory allocated or processor time, access rights, or any other resource that may be owned or credited to an account associated with an account holder. In many of the examples herein, monetary resources may be referenced to illustrate concepts, but the present application is not necessarily solely applicable to financial or monetary instruments or resources.

The transfer message is specially formatted to include parameters of a transfer. The parameters may be included as metadata in the transfer message. Where the request to transfer is an ISO20022 message, the parameters may be included in an ISO20022 format. The parameters may include resource definition data. By way of example, the resource definition data may define a resource that is stored in or otherwise associated with a record associated with a transferor or recipient.

The transfer message may, in some implementations, be or represent a payment. Such a message may be referred to as a payment message. In such implementations, the transfer rail may be a payment rail such as a real time payment rail and the database management systems may be a financial institution system. In at least some such implementations, the records may represent bank accounts and a transfer may be a request to transfer value from a sender bank account to the recipient bank account. The transfer message may be sent from a first financial institution system, which is associated with a first financial institution, to a second financial institution system, which is associated with a second financial institution.

The transfer message may, in some implementations, be or include a request to transfer. A request to transfer may be a specially formatted message that is sent from a first database management system to a second database management system. The request to transfer may be sent from the first database management system to the second database management system over a transfer rail that is used for facilitating transfers between databases associated with different database management systems. For example, the first database management system may be associated with a first database and the second database management system may be associated with a second database. The databases may store account data. That is, the databases may store data that is associated with various accounts. In at least some implementations, each record in the database may be associated with a particular one of these accounts.

A request to transfer is a message that is sent on behalf of a recipient to initiate a transfer from a sender to the recipient. That is, the request to transfer is sent, on behalf of the recipient, from the database management system associated with the recipient to the database management system associated with the sender. The request to transfer requests a transfer from a record in the database that is associated with the sender to a record in the database that is associated with the recipient. The request to transfer includes one or more identifiers that identify the record associated with the sender and/or the record associated with the recipient. The identifier(s) may be or include an account number. The request to transfer may also include one or more identifiers that identify the database management system associated with the sender and/or that identify the database management system associated with the recipient. Such identifiers may be or include one or more of: a transit number and an institution number.

The request to transfer is a transfer initiation message. That is, the request to transfer is an initial message that may be used to cause a transfer to occur. Since the request to transfer is initiated by a recipient rather than a sender, the request to transfer may be considered to a pull-style transfer, which may be contrasted with typical push-style transfers. In at least some implementations, the request to transfer may be formatted as an ISO20022 message.

Additionally or alternatively, the system may allow for the upload of a resource demand and/or resource demand parameters. The uploaded resource demand and/or parameters may, for example, be in a document format such as Portable Document Format (PDF) file or a media format such as Joint Photographic Experts Group (JPEG or JPG), that may be processed to identify parameters included in the resource demand and parameters.

For example, the data may be received from a client device via an upload interface displayed on the client device. The upload interface may be an interface, such as a web interface (e.g., a web page) displayed in a web browser on the client device, and may be provided, by the resource demand processing system, or another computer system(s) performing the method 600 of FIG. 6, to the client device for display. The upload interface may, for example, be provided by the first computing system in response to a request issued from the client device to the first computing system over the network. For example, the upload interface may be provided in response to an HTTP GET received at the first computing system from the client device. The user interface may include one or more interface elements configured for receiving input of one or more parameters. For example, the user interface may include one or more interface elements that prompt an operator or user to input data. For example, the user interface may allow an operator or user to select one or more resource demand files and/or resource demand parameters to upload.

Figure 9:
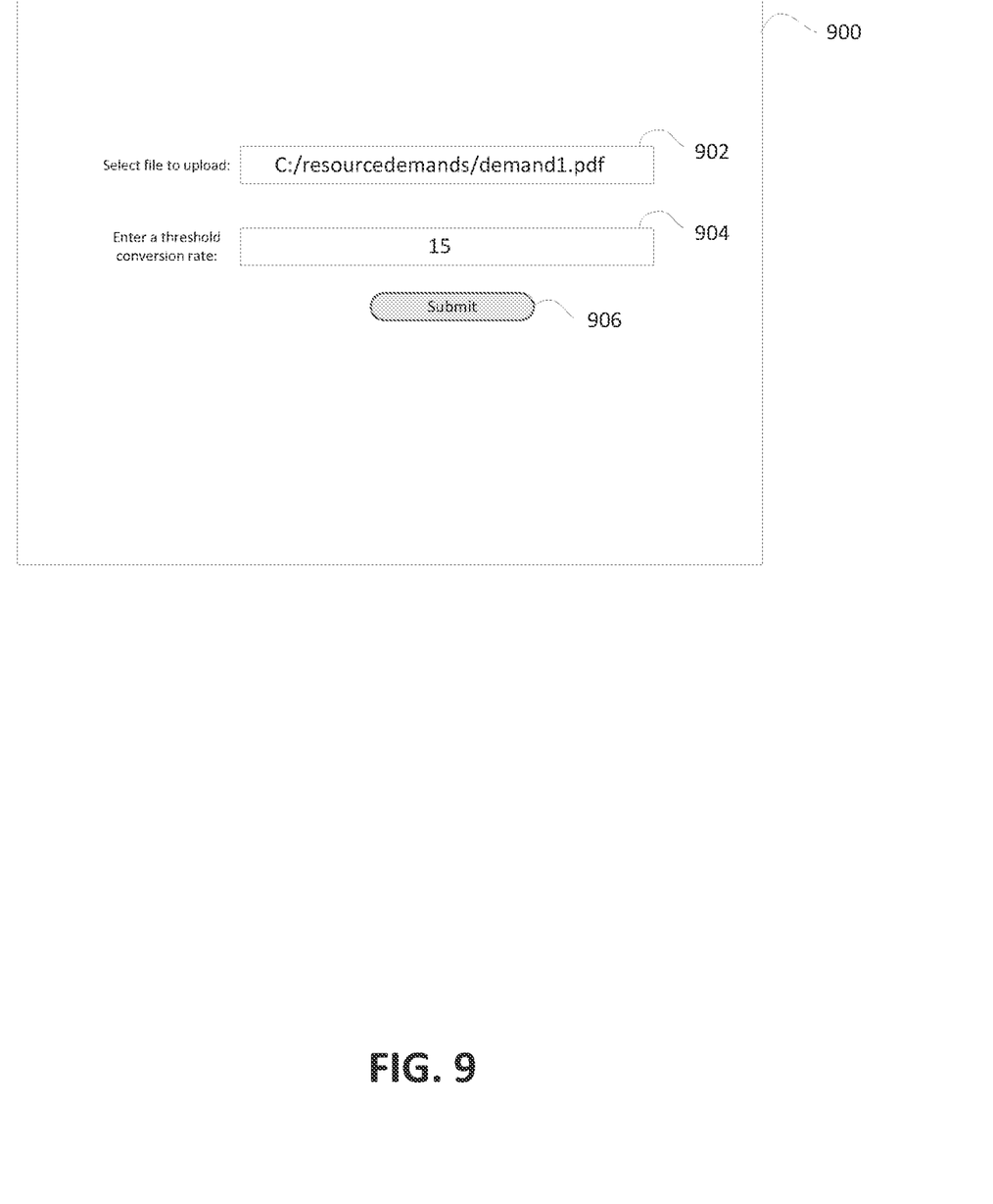
FIG. 9 is an example graphical input interface in connection with uploading a resource demand and a parameter of a resource demand.

Referring briefly to FIG. 9, an example upload interface 900 is illustrated. The upload interface 900 may be displayed at the client device in a web browser after an address associated with the upload interface 900 is input into the web browser; for example, using the address bar. The upload interface includes a selectable option for uploading a resource demand file. For example, a file locator selectable option 902 may be displayed and used for identifying a pointer to a local file. The pointer may include, for example, a path name and file name of the resource demand file. The upload interface 900 also includes a begin upload selectable option 906 which may be activated in order to trigger the sending of the resource demand file from the client device to the resource demand processing system or another computer system(s) performing the method 700 of FIG. 7.

Also shown in FIG. 9, the upload interface 900 may further include an option for uploading a resource demand parameter. The threshold selectable option 904 may be optional and activated by entering a value. The threshold value may additionally or alternatively trigger the detection of the resource optimization opportunity.

The upload interface 900 may, in at least some embodiments, be provided to the client device after the client device has successfully authenticated itself as being associated with a particular account in a database using a credential (e.g., username/password, biometric data, etc.). That is, the client device uses a credential to confirm that it is associated with a particular account-holder, who may be referred to as an authenticated entity after successful authentication.

The resource demand file and resource demand parameters that may be uploaded using the upload interface 900 are, therefore, associated with a particular account. The resource demand defined in the resource demand file may represent a future transfer of resources from that particular account to other accounts. The other accounts may include accounts in the same database (e.g., accounts at the same financial institution) and/or accounts in a different database (e.g., accounts at a different financial institution). In at least some implementations, the transfer may represent a payment.

A resource demand file and/or resource demand parameters may be of the type described previously. For example, the resource demand file may define a single requested resource demand associated with a database. The database may be, for example, the data store 116 associated with the first computing system 106 or associated with the financial institution operating the first computing system 106. This data store 116 may maintain account balances for various bank accounts. The resource demand in the resource demand file may define information sufficient to initiate and complete a transfer. A resource demand file may be associated with a single transferor. For example, the resource demand file may include a transfer that transfers resources from an account associated with the authenticated entity. The system may extract such information, as well as other information, from the resource demand file and/or resource demand conditions file by applying optical character recognition (OCR) techniques to the and/or resource demand conditions file.

The receipt, by the first computing system, of the resource demand and/or resource demand conditions may trigger one or more operations. For example, the receipt of the resource demand may trigger the first computing system to detect a resource demand opportunity.

Referring back to FIG. 7, the receipt by the first computing system of data identifying the resource demand and corresponding parameters may trigger one or more operations of the method 700 of FIG. 7. For example, in operation 704, in response to receiving the representation and data identifying the demand for the resource, the first computing system may extract, from the representation of the resource demand, data identifying a demand for a resource. Various techniques, including optical character recognition operations may be used to extract data from the representation. The extracted data may include the contents of various fields of the representation. The computing system may also extract from the representation of the resource demand data identifying one or more parameters corresponding to or associated with the resource demand.

In operation 706, the computing system obtains one or more parameters of the resource demand. In some embodiments, the one or more parameters may be obtained from the extracted data. Various techniques, includes natural language processing operations may be used to obtain a parameter from the extracted data.

Example parameters that may be included in the data identifying the resource demand include: a resource demand identifier identifying the particular resource demand; identification information of a type of resource demand (e.g. request for payment, request for transfer); scheduling data (e.g. payment due date or transfer deadline); identification information of the first and/or second account holders (e.g. full name, postal address, contact details, telephone number, email address, alias); an amount of resources to be transferred; routing data; a defined date; and one or more thresholds. The routing data may include: identification information of the first and/or second system and/or the entity associated with, operating or managing the first and/or second system (e.g. a routing number, financial institution identifier, and/or branch transit number associated with the first and/or second system); and/or identification information of a first and/or second logical storage area, for example, a logical storage area identifier (e.g. bank account number), associated with, managed or controlled by a respective first and/or second account holder to or from which the amount of resources is to be transferred. A logical storage area may be or include an area of a data store. A logical storage area may further be or represent a bank account or other logical storage area for storing a quantity of a resource.

Example parameters that may be included in the data identifying the resource demand include an indication of a flag to be used in determining whether a resource optimization opportunity exists. In some embodiments, the parameter may indicate whether a resource demand supports being used to optimize a resource.

In operation 708, the computing system determines whether the one or more parameters include a flag indicating that fulfillment of the resource demand may be advanced in response to the identification of the resource optimization opportunity. If the computing system detects the flag, then the computing system may in operation 712 determine whether a favorable conversion rate is detected. Otherwise, the first computing system may in operation 716 fulfil the resource demand on the defined date which may, in some embodiments, include completing the transfer of an amount of the resource.

In operation 712, the computing system determines whether a favorable conversion rate exists for converting a resource indicated by the resource demand from a first type to a second type of resource. For example, the resource may be or represent a foreign transfer medium such as a foreign medium of exchange or foreign resource. The foreign medium of exchange or foreign resource may be, for example, a data compression algorithm not native to the computing system initiating the computing process, a codec not native to the computing system initiating the computing process, or a foreign currency or exchange medium not considered native by the computing system initiating the computing process.

In some embodiments, the determination may include a comparison of a threshold conversion rate parameter with a current conversion rate. The current conversion rate may be a rate generated in real-time by the computing system using a conversion rate engine. If the current conversion rate meets the threshold rate, then a current conversion rate may be considered favorable. Otherwise, the current conversion rate may be unfavorable. If the computing system detects the favorable conversion rate, then the computing system may in operation 714 determine whether a shortfall event is expected. Otherwise, the first computing system may in operation 716 fulfil the resource demand on the defined date.

In operation 714, the computing system determines whether a shortfall event is projected by advancement of the fulfilment of the resource demand. For example, if a shortfall event is projected, then the resource demand may in operation 716 be fulfilled on the defined date. If a shortfall event is not projected, then the computing system may in operation 718 take another action to facilitate the fulfilment of the resource demand prior to the defined date.

Taking an action in operation 718 may correspond to one or more of the operations 610, 612 and 614 of the method 600 of FIG. 6. In some embodiments, taking an action includes generating a message to fulfil the resource demand, or for example, complete a transfer or payment, at the time the favorable conversion rate is detected and prior to the defined date. The generated message may be a transfer message for transferring an amount of the resource. The generated message may be sent to a computing system associated with the recipient of the resource.

Figure 8:
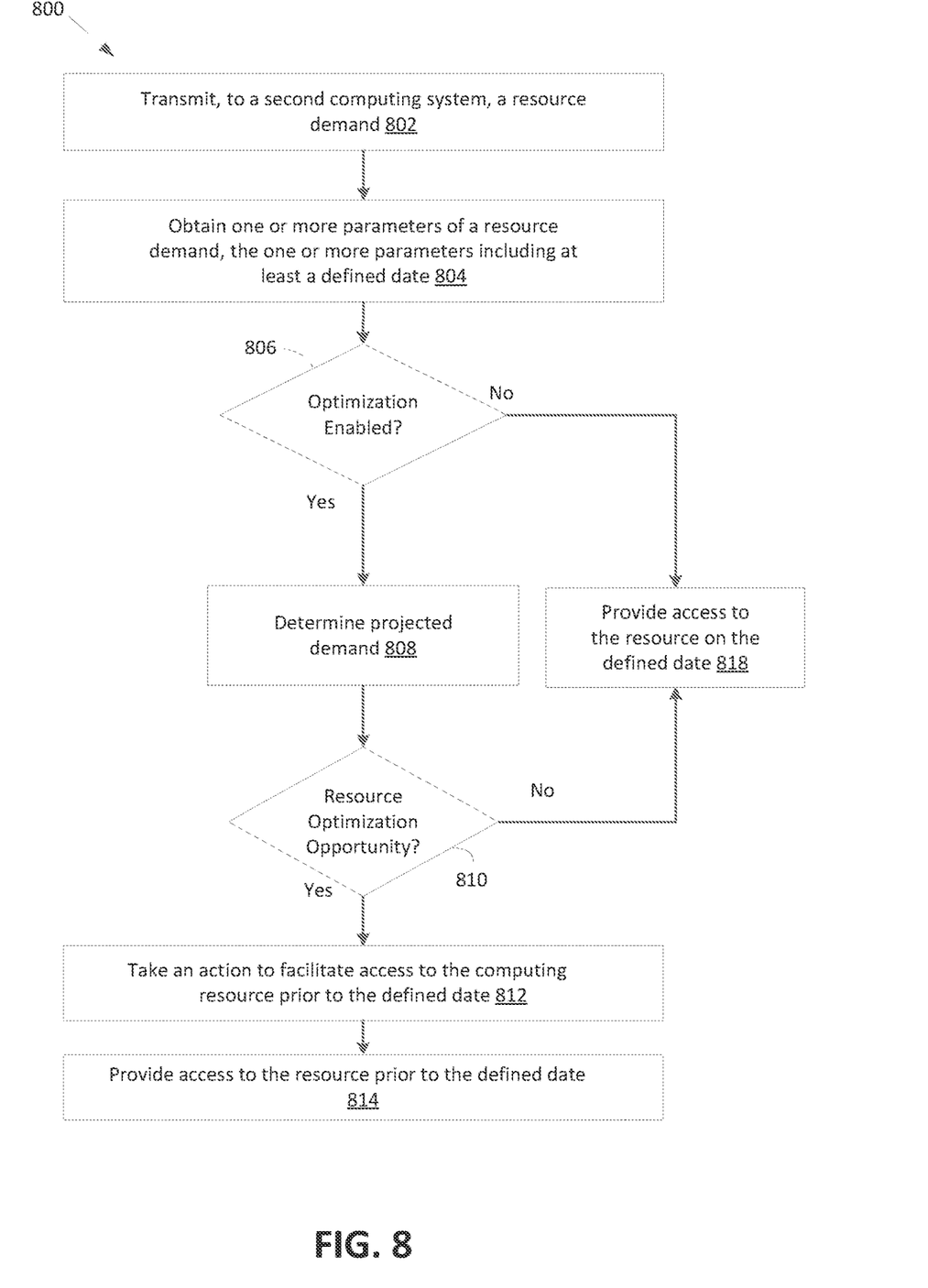
FIG. 8 is yet another flowchart showing operations performed in providing optimization of a computing resource, according to an example embodiment.

Reference will now be made to FIG. 8 which illustrates an example method 800 for optimizing a computing resource. The operations of the example method 800 may be performed by a computer system which may be of the type described herein. In some embodiments, the operations may be performed by the computing system of FIG. 6. It will be appreciated that one or more of the operations of the method 800 may correspond to or implement one or more of the operations of the method 600 of FIG. 6 and/or the method 700 of FIG. 7.

In operation 802, the computing system transmits, to a second computing system, a resource demand.

In operation 804, the computing system obtains one or more parameters of the resource demand, the one or more parameters including at least a defined date.

In operation 806, the computing system, determines whether the one or more parameters include a flag indicating that fulfillment of the resource demand may be advanced in response to the identification of the resource optimization opportunity. If there is an indication that the resource demand may be fulfilled before the defined date, then the computing system may in operation 808 determine a projected demand. Otherwise, the first computing system may in operation 818 fulfil the resource demand on the defined date.

In operation 808, the computing system determines a demand for the resource that is projected to exist at the defined date.

In operation 810, the computing system determines whether a resource optimization opportunity exists. The determination may include a determination of whether a shortfall event is projected. The shortfall event may, for example, be in connection with an available amount of the resource prior to the defined date. If a shortfall event is not expected to occur prior to the defined date, then the computing system may in operation 818 provide access to the resource on the defined date. Otherwise, the computing system may in operation 812 take an action to facilitate access to the resource prior to the defined date.

In operation 812, the computing system takes an action to facilitate access to the resource prior to the defined date by transmitting a generated message to the second computer system. The action taken may correspond to one or more of the operations 610, 612 and 614 of the method 600 of FIG. 6. In particular, the computer system may generate a message based on the identification of the resource optimization opportunity. In some embodiments, the generated message includes a modified version of the resource demand. The modified version of the resource demand may provide an offer to demand a reduced amount if the resource demand is satisfied prior the defined date. The reduced amount may be determined based on a cost of borrowing to borrow resources to avoid the projected shortfall event.

In operation 814, the computing system provides access to the resource prior to the defined date and completes the fulfilment of the resource demand.

It will be appreciated that it may be that some or all of the above-described operations of the various above-described example methods may be performed in orders other than those illustrated and/or may be performed concurrently without varying the overall operation of those methods.

It will also be appreciated that some or all of the above-described operations of the various above-described example methods may be triggered by, or caused by, or performed in response to, one or more of the above-described operations, and may be performed in real-time.

Some of the embodiments described herein focus on a transfer message that is provided as either a payment or request for payment. However, it is understood that the present application is not limited to any such embodiments and that the embodiments described with respect to a particular type of transfer generally may be extended to other types of transfers.

Although many of the above examples refer to an "object" when discussing a data structure, it will be appreciated that this does not necessarily restrict the present application to implementation using object-oriented programming languages, and does not necessarily imply that the data structure is of a particular type or format. Data structures may have different names in different software paradigms.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A computer system comprising:
  a communications module;
  one or more processors coupled to the communications module; and
  a memory coupled to the one or more processors and storing instructions that, when executed by the computer system, cause the computer system to:
    obtain one or more parameters of a resource demand, the one or more parameters including at least a defined date;
    identify, based on a projected demand for a computing resource, a resource optimization opportunity prior to the defined date;
    generate a message based on the identification of the resource optimization opportunity;
    identify a second computer system based on the resource demand; and
    facilitate access to the computing resource prior to the defined date by a transmission of the generated message to the identified second computer system prior to the defined date.

2. The computer system of claim 1, wherein the one or more parameters include one or more thresholds used to identify the resource optimization opportunity.

3. The computer system of claim 1, wherein the instructions that, when executed by the computer system, cause the computer system to identify the resource optimization opportunity include instructions that, when executed by the computer system, cause the computer system to detect a projected shortfall event.

4. The computer system of claim 1, wherein the generated message includes a modified version of the resource demand.

5. The computer system of claim 4, wherein the modified version of the resource demand provides an offer to demand a reduced amount if the resource demand is satisfied prior to the defined date.

6. The computer system of claim 5, wherein the reduced amount is determined based on a cost of borrowing to borrow resources to avoid a projected shortfall event.

7. The computer system of claim 1, wherein the instructions that, when executed by the computer system, cause the computer system to identify the resource optimization opportunity include instructions that, when executed by the computer system, cause the computer system to:
  detect a favorable conversion rate of the computing resource; and
  determine that the computing resource is not expected to experience a shortfall event by an advancement of a transfer associated with the resource demand.

8. The computer system of claim 1, wherein the generated message includes a transfer of an amount of the computing resource.

9. The computer system of claim 1, the identification of the resource optimization opportunity is based on one or more of:
  a determination that a current conversion rate for satisfying the resource demand is a favorable conversion rate;
  a determination that a projected account balance is expected to remain above a threshold; and
  a determination that an expected account balance will fall below a threshold.

10. The computer system of claim 1, wherein the one or more parameters include one or more variables to be used in the identification of the resource optimization opportunity.

11. The computer system of claim 1, wherein the one or more parameters include a flag indicating that fulfillment of the resource demand may be advanced in response to the identification of the resource optimization opportunity.

12. The computer system of claim 1, wherein the resource demand includes a request for payment.

13. A computer-implemented method, the method comprising:
- obtaining one or more parameters of a resource demand, the one or more parameters including at least a defined date;
- identifying, based on a projected demand for a computing resource, a resource optimization opportunity prior to the defined date;
- generating a message based on the identification of the resource optimization opportunity;
- identifying a second computer system based on the resource demand; and
- facilitating access to the computing resource prior to the defined date by transmitting the generated message to the identified second computer system prior to the defined date.

14. The method of claim 13, wherein the one or more parameters include one or more thresholds used to identify the resource optimization opportunity.

15. The method of claim 13, wherein identifying the resource optimization opportunity includes detecting a projected shortfall event.

16. The method of claim 13, wherein the generated message includes a modified version of the resource demand.

17. The method of claim 16, wherein the modified version of the resource demand provides an offer to demand a reduced amount if the resource demand is satisfied prior to the defined date.

18. The method of claim 17, wherein the reduced amount is determined based on a cost of borrowing to borrow resources to avoid a projected shortfall event.

19. The method of claim 13, wherein identifying the resource optimization opportunity includes:
- detecting a favorable conversion rate of the computing resource; and
- determining that the computing resource is not expected to experience a shortfall event by advancing a transfer associated with the resource demand.

20. A non-transitory computer-readable storage medium comprising processor-executable instructions which, when executed, configure one or more processors to:
- obtain one or more parameters of a resource demand, the one or more parameters including at least a defined date;
- identify, based on a projected demand for a computing resource, a resource optimization opportunity prior to the defined date;
- generate a message based on the identification of the resource optimization opportunity;
- identify a second computer system based on the resource demand; and
- facilitate access to the computing resource prior to the defined date by a transmission of the generated message to the identified second computer system prior to the defined date.

* * * * *